United States Patent Office 3,337,740
Patented Aug. 22, 1967

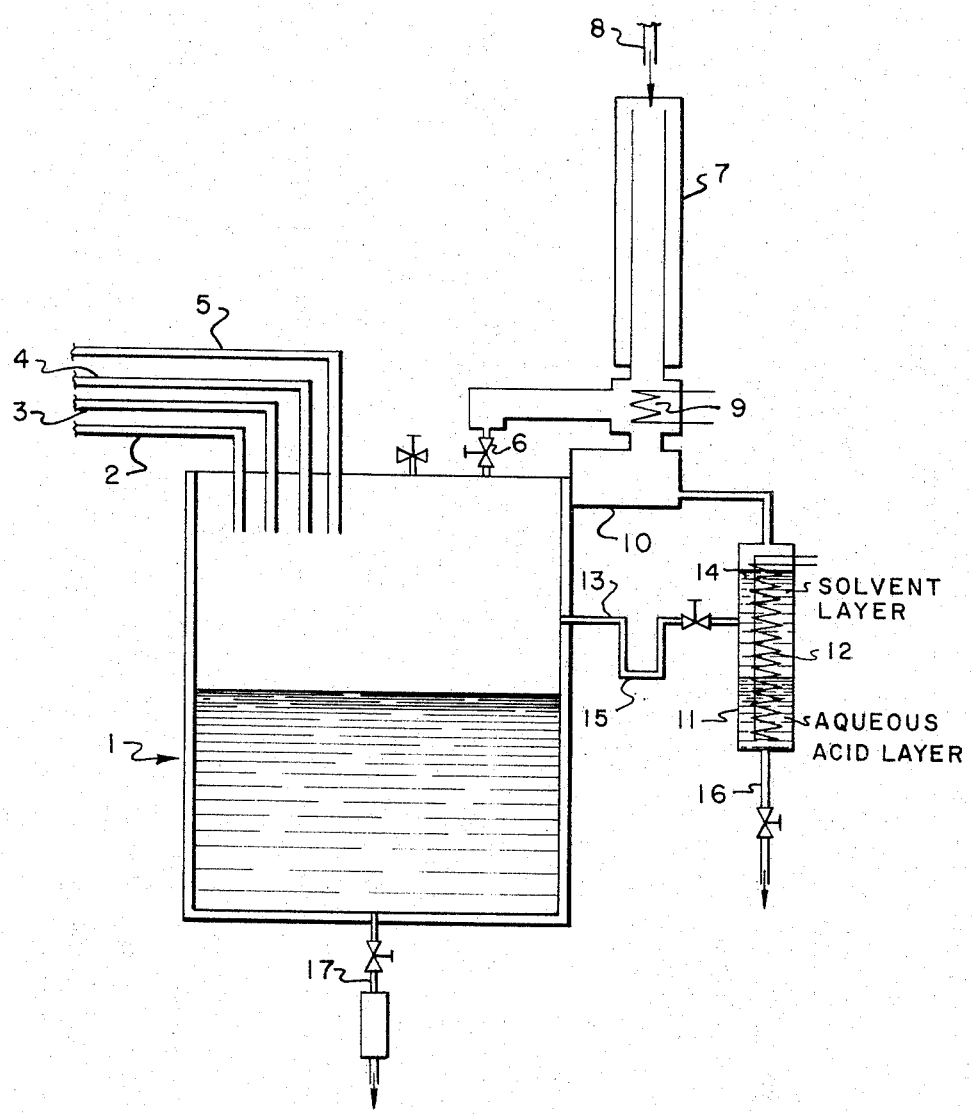

3,337,740
PROCESS FOR SEPARATING ACRYLIC ACID FROM IMPURITIES
Michael H. Gray, Edward C. Horton, Jr., and Hay F. Sparks, Jr., Spartanburg, S.C., assignors to Deering Milliken Research Corporation, Spartanburg, S.C., a corporation of Delaware
Filed Feb. 13, 1962, Ser. No. 172,930
13 Claims. (Cl. 260—526)

This invention relates to a novel process for the manufacture of acrylic acid, and, more particularly, to an improved procedure for separating acrylic acid from the by-products of the various reactions for producing acrylic acid, such as by the hydrolysis of acrylonitrile.

With the increased use of acrylic resins, a great deal of effort has been expended in recent years toward improving the production of one of the raw materials for the production of acrylic resins, i.e., acrylic acid. This particular acid is characterized by the extreme ease with which it undergoes polymerization. This characteristic of acrylic acid greatly complicates not only the actual reactions through which the acrylic acid is produced, but also the separation of acrylic acid from the by-products of the various reactions involved. For example, acrylic acid may be produced by the acid hydrolysis of acrylonitrile. During the hydrolysis, the acrylic acid tends to polymerize as it is produced, probably because of the high temperatures, for example, about 360° F., at which the hydrolysis was conducted prior to this invention. This difficulty has been only partially overcome by the addition to the hydrolysis mix of various inhibitors for the polymerization. In addition to this difficulty, no satisfactory procedure has been developed for separating the acrylic acid from the by-products of the hydrolysis reaction.

The most common technique for separating the acrylic acid from the by-products involves direct distillation of the acid from the hydrolysis mixture. Once again, however, a distillation temperature of about 360° F. is required and, at this temperature, the acid concentration in the vapor state is sufficiently high to permit substantial polymerization of the acrylic acid to occur.

The difficulties inherent in prior art processes for the production of acrylic acids and the separation thereof from by-products of the various processes by which acrylic acid is produced are eliminated by the process of the present invention wherein acrylic acid is produced and separated from by-products of the reaction with no measurable amount of polymerization of the acrylic acid occurring. Polymer formation during the hydrolysis of acrylonitrile to acrylic acid has been substantially eliminated by conducting the hydrolysis at temperatures below about 250° F., preferably about 212° F. The reaction temperature is maintained at this lower level by adding acrylonitrile slowly to the acid system, so that the acrylonitrile reacts immediately and the heat of this exothermic reaction is dissipated through the hydrolysis mixture. In addition, cooling means are provided so that the temperature of the hydrolysis mix can be maintained at a temperature below about 250° F. These techniques greatly reduce the amount of time involved in the hydrolysis, providing a reaction time on the order of about six hours. This reaction time can be reduced still further by conducting the hydrolysis under a pressure of approximately 5 to about 25 p.s.i.g.

*Recovery process*

Problems associated with the polymerization of acrylic acid during the separation of the acid from by-products of the hydrolysis reaction and other reactions for producing acrylic acid have been solved in accordance with this invention by adding to the hydrolysis mix, after the reaction has been completed, an organic solvent for the acrylic acid. This solvent is characterized by its immiscibility in water and, preferably, has a boiling point at a temperature between about 260° and about 350° F., most preferably exceeding slightly the boiling point of acrylic acid of about 287° F. After the mixture is agitated to dissolve the acrylic acid within the solvent, the resulting system is then continuously heated to the minimum temperature sufficient to volatilize the organic solution of acrylic acid and separate the solution from the hydrolysis mix. The volatilized solution is then removed from the hydrolysis kettle (which also functions as a distillation kettle) and cooled to a temperature sufficient to condense the vapors of the acrylic acid solution. Generally, temperatures on the order of about 284° F. are sufficient to condense the volatilized solution. The condensate is then cooled immediately to below about 120° F. to inhibit the polymerization of acrylic acid which tends to occur at elevated temperatures.

In a highly preferred embodiment of this invention, the acrylic acid is then most expeditiously separated from the solvent system by adding to the condensate, preferably during the condensation, a sufficient amount of water to dissolve the acrylic acid preferentially from the solvent system. By dissolving a small amount of an organic inhibitor in the water added to the condensate, polymerization of the acrylic acid during the condensation may be completely eliminated, particularly when the condensate is maintained at a temperature below about 120° F. until substantial separation of the acrylic acid from the solvent phase has been effected. The mixture of water and condensate is then passed into a reservoir where the acrylic acid separates from the organic solvent and preferentially dissolves into the water.

If desired, water can also be added to the hydrolysis mixture during the distillation. This expedient not only reduces the temperature at which the distillation takes place, thereby further inhibiting polymer formation, but also condenses with the acrylic acid-solvent system at approximately the same time that water is added during the condensing step, thereby facilitating the extraction of the acrylic acid from the solvent system.

The aqueous solution of the acrylic acid may be readily separated from the solvent layer in the reservoir. In a preferred embodiment of this invention, the solvent layer in the reservoir is then recirculated back into the hydrolysis mix, thereby keeping the temperature in the hydrolysis kettle at a level approximating the boiling point of the solvent and aiding in the inhibition of polymer formation during distillation. The recirculation of the solvent maintains the concentration of acrylic acid in the vapor state at a low level, thereby further aiding the inhibition of polymerization. Foaming in the kettle is minimized by recirculating the solvent back into the hydrolysis kettle, not only because of polymer inhibition but also because the viscosity of the hydrolysis mixture is maintained at a level where foaming cannot occur. The recirculating solvent should be passed back into the hydrolysis kettle in such a manner as to prevent the volatilizing organic solution of the acrylic acid from passing back into the solvent system located in the reservoir. This may be accomplished simply through the use of a U-tube type conduit for recirculating purposes.

The organic solvent for acrylic acid which is utilized in accordance with this invention has a boiling point between about 260° and about 350° F., or even higher where desired. Organic solvents for acrylic acid which boil within this temperature range are selected so that acrylic acid solutions in these solvents will distill at temperatures just exceeding the boiling point of acrylic acid, i.e., just exceeding 287° F., so that the solvent and acrylic acid will distill out of the reactor together at the lowest possible temperature thereby greatly minimizing the tendency of acrylic acid to polymerize during the distillation. If the resulting acrylic acid solution has a boiling point significantly lower than 287° F., such as would occur when the organic solvent boils at about 230° F., the vapor formed during distillation is mostly solvent and the distillation process is unduly prolonged.

On the other hand, if the resulting acrylic acid solution has a boiling point significantly higher than 287° F., such as when a solvent for acrylic acid having a temperature far exceeding the boiling point of acrylic acid is utilized, the vapor is heavily concentrated with acrylic acid which tends to polymerize readily under these conditions. With the preferred solvent system, however, which provides organic solutions of acrylic acid which boil at temperatures approximating the boiling point of acrylic acid, the temperature of the vapor and the concentration of acrylic acid and solvent in the vapor are at an optimum level for the inhibition of polymer in the vapor.

Suitable solvents for acrylic acid having boiling points within the desired range are o-, m-, and p-xylene. Phillips 66 Naphthol (B.P. —310° F.), Gulf Stoddard solvent (B.P. —315° F.), and Esso Varsol (B.P. —320° F.) and the like, the Stoddard solvent and Varsol both being oil fractions in the kerosene range. While these solvents are entirely suitable for use in accordance with this invention, a slight amount of some of the components of the commercial solvents remains in the aqueous acrylic acid solutions provided in accordance with this invention and causes a slight clouding of the solution. Where this is objectionable, the undesired components can be stripped from the aqueous solution by a simple steam distillation process wherein steam is passed through the solution. The immiscible components from the solvent readily separate from the remaining water and acrylic acid of the condensate.

A completely clear aqueous solution of acrylic acid is provided, however, with a solvent sold by Esso as Solvent WS–4214 and this solvent is preferred for use in accordance with this invention. This particular solvent for acrylic acid has a flash point of 284° F. and contains 98.5 to 99.5% of saturated hydrocarbon chains, primarily $C_{11}$ and $C_{12}$, 95% of which are isoparaffinic.

Sufficient solvent should be added to the hydrolysis mix to provide a solution of acrylic acid of a concentration between about 10 and about 90% by weight of the acid. The more dilute the solution, the better control over polymerization inhibition is provided. However, this degree of control must be balanced for economic purposes with the lengthy period of time required to effect the distillation at extreme dilutions of the acid. Generally, a concentration between about 60 and about 70% by weight of the acid is preferred as an optimum balance of economics and polymer inhibition.

In heating the system to volatilize the acrylic acid solution, temperatures between about 260° and about 350° F. are preferred, since these temperatures are adequate to volatilize the preferred solution, while being sufficiently low to inhibit polymerization of the vaporous acid in the solvent system. The temperature selected is most preferably above the boiling point of acrylic acid and at the lowest possible temperature for distilling over both solvent and acid.

Sufficient water is added to the condensate and/or the hydrolysis mix to effect substantially complete dissolution of the acrylic acid and separation from the solvent system after condensation. In general, the amount of water added in this step is not critical, provided at least enough water is present to dissolve substantially the entire amount of acid present in the solvent system. Less water may be utilized, although it should be realized that this would be a lesser preferred embodiment of this invention.

By maintaining the condensate-water system at a temperature below about 120° F., including 80° F. and below about 80° F., the inhibition of polymerization is greatly facilitated. Cooling may be effected in any convenient manner, such as by passing the condensate over cooling coils or tubes. This lower temperature should be maintained throughout the recovery process for the acid. By so doing, not only is polymer formation most readily inhibited but also the amount of inhibitor necessary to completely eliminate polymer formation is greatly reduced. For example, when the condensate is cooled only to about 284° F., about 1% by weight of the acrylic acid of inhibitor is required to inhibit polymer formation. This amount of inhibitor, however, often discolors the acrylic acid. On the other hand, concentrations as low as 0.02% by weight of the inhibitor are entirely suitable for the elimination of polymerization which would occur at the 120° F. level. The lower levels of inhibitor, therefore, are highly desirable in the production of acrylic acid. Generally, the concentration of inhibitor added to the condensate should lie between 0.01 and 0.1% by weight of the acid.

Any of the well known inhibitors for the polymerization of acrylic acid may be used, including anhydrous metal halides (of antimony, arsenic, aluminum, bismuth and the like); chromium salts, such as chromium methacrylate; powdered or flaked metallic inhibitors, such as copper; metallic salts, such as copper sulfate; sulfur; organic inhibitors, such as diphenylamine, hydroquinone, p-methoxyphenol and the like.

When the condensate-water system is permitted to settle in a reservoir, two distinct layers separate from the system, the upper layer containing the solvent and the lower layer containing the acrylic acid in solution in the water. The amount of water added to the system can be controlled to provide the concentration of acrylic acid desired. For example, if a 30% solution of acrylic acid is desired, sufficient water is added to the condensate and/or the hydrolysis mix so that the acrylic acid solution recovered from the condensate system is at the 30% level.

Suitable apparatus for conducting the improved process for the production of acrylic acid is shown in the drawing, which illustrates schematically a pressurized hydrolysis kettle 1, equipped with feed inlets 2, 3, 4 and 5, respectively for acrylonitrile, sulfuric acid, solvent and water. The hydrolysis kettle is also equipped with a valve 6 which, when open, permits the passage of vapor into condenser 7, which is fitted with a water inlet 8 and a cooling coil 9. This condenser is fitted, through tube cooler 10, to reservoir 11, which is equipped with cooling coils 12. A recirculating U-tube type feed line 13 is fitted between the hydrolysis kettle 1 and the solvent layer portion 14 in the reservoir, the U-tube feature of this recirculating line permitting a solvent trap 15 to form, so that vapors may not pass from the hydrolysis kettle back into the reservoir. Suitable fittings 16 and 17 are provided to permit withdrawal of the aqueous acrylic acid solution and distillation residue, including the solvent, respectively.

In a typical operation utilizing this equipment, 51 lbs. of water, 1 lb. of copper powder, 0.775 lb. of p-methoxy phenol and 150 lbs. of 98% sulfuric acids are poured into a Pfaudler glass-lined reactor rated for operation at a maximum pressure of 25 p.s.i.g. The heat of solution raises the temperature in the kettle to approximately 250° F., so water at 190° F. is circulated through the cooling jacket of the reactor until the temperature is reduced to 225° F. At this temperature, acrylonitrile is fed in slowly at the rate of about 25 lbs. per hour. The feed rate is adjusted periodically to maintain the pressure, which tends to increase during the hydrolysis reaction, below 15 p.s.i.g., and the temperature at about 225° F. Temperature control is also facilitated by circulating water at 190° F. through the cooling jacket of the reactor. After the acrylonitrile has been fed at this approximate rate for about three hours, during which time 79.5 lbs. of acrylonitrile has been added, the acrylonitrile feed is terminated and the hydrolysis reaction is permitted to continue to completion for about 1 hour at 225° F. As the reaction continues, the pressure drops off to a value of about 0 p.s.i.g. The hydrolysis is then considered to be complete.

Thirty lbs. of a solvent sold by Esso as Solvent WS-4214 are then added to the reaction and a steam pressure of 90 p.s.i.g. is placed on the jacket surrounding the kettle. The temperature of the mixture increases until 295° F. is reached. At this point vapor begins distilling over into the condenser through opened valve 6 and water is added to the hydrolysis mixture within the reactor at a rate of 7 lbs. per hour. During the distillation, about 40 lbs. of water is added directly to the hydrolysis mixture. During the same period of time, about 120 lbs. of water containing 0.0165 lb. of p-methoxyphenol as an inhibitor is pumped into the tubes at the top of the condenser. This water flows down the tubes and mixes with the condensing vapors.

The condensate, maintained at about 80° F., is then permitted to settle into the reservoir where it separates into two layers. The aqueous solution of the acrylic acid layer, being more dense, is drawn continuously from the bottom of the reservoir and the solvent layer is returned to the reactor through the solvent return line. The height of the solvent layer in the reservoir is controlled by the rate of return of the solvent in the reactor. Also, the height of the acid layer is controlled by the rate of flow of the acid solution from the trap.

Distillation is discontinued after about 9 to 10 hours when a yield of 82 to 85% of the available acrylic acid is obtained. Higher yields of the acid can be attained but at a diminished rate of return. The aqueous solution of acrylic acid so obtained is ready for use directly as a textile sizing composition.

When the distillation is completed, the reactor is opened and water poured into the hydrolysis mixture. The water dissolves the ammonium acid sulfate and also cools the mixture. The agitation is then stopped and the solvent and aqueous solution of ammonium acid sulfate separates, the solvent being the top layer. The valve at the bottom is opened and the kettle is drained, the top layer of solvent being recovered in this manner. Better than 90% recovery of the solvent is obtained by this technique.

The separation and recovery technique described herein may also be applied to the separation of acrylic acid from the by-products of other reactions for the production of acrylic acid, such as the oxidation of methylvinyl ketone with hypohalites, the hydrolysis of ethylene cyanohydrin, the dehydrohalogenation of beta-chloropropionic acid and the catalytic hydrolysis of maleic anhydrides. Other members of the acrylic acid series, such as the α-substituted acrylic acids, e.g., methacrylic acid, may also be treated in accordance with this invention.

That which is claimed is:

1. A process for separating acrylic acid from a system including a mixture of acrylic acid and impurities comprising:
   (A) dissolving at least a substantial proportion of the acrylic acid in an organic solvent therefor, said solvent being characterized by its immiscibility in water and by a boiling point between about 260° and about 350° F.;
   (B) Adding water to the mixture;
   (C) Co-distilling the acrylic acid-solvent-water from the mixture; and
   (D) Separating the aqueous acrylic acid from the condensate.

2. The process of claim 1 wherein additional water is added to the acrylic acid-solvent-water condensate.

3. The process of claim 2 wherein the water added to the condensate contains an inhibitor for the polymerization of acrylic acid.

4. The process of claim 1 wherein the condensate is maintained at a temperature below about 120° F. until final separation of the aqueous acrylic acid therefrom.

5. The process of claim 1 wherein the organic solvent-condensate is recirculated to the mixture as the co-distillation of the acrylic acid-solvent water continues.

6. The process of claim 1 wherein the organic solvent has a flash point of 284° F. and contains 98.5 to 99.5% of saturated hydrocarbon chains, primarily $C_{11}$ and $C_{12}$, 95% of which are isoparaffinic.

7. The process of claim 1 wherein sufficient organic solvent is added to provide a solution of a concentration between about 10 and about 90% of acrylic acid.

8. A process for separating acrylic acid from a system including a mixture of acrylic acid and impurities comprising:
   (A) Dissolving at least a substantial proportion of the acrylic acid in an organic solvent therefor, said solvent being characterized by its immiscibility in water and by a boiling point between about 260° and about 350° F.;
   (B) Co-distilling the acrylic acid-solvent from the mixture;
   (C) Adding water to the condensate; and
   (D) Separating aqueous acrylic acid from the condensate.

9. The process of claim 8 wherein the water added to the condensate contains an inhibitor for the polymerization of acrylic acid.

10. The process of claim 8 wherein the condensate is maintained at a temperature below about 120° F. until final separation therefrom.

11. The process of claim 8 wherein the organic solvent is recirculated to the mixture after the aqueous acrylic acid is separated therefrom.

12. The process of claim 8 wherein the organic solvent has a flash point of 284° F. and contains 98.5 to 99.5% of saturated hydrocarbon chains, primarily $C_{11}$ and $C_{12}$, 95% of which are isoparaffinic.

13. The process of claim 8 wherein sufficient organic solvent is added to provide a solution of a concentration between about 10 and about 90% of acrylic acid.

References Cited

UNITED STATES PATENTS

| | | | |
|---|---|---|---|
| 2,171,795 | 9/1939 | Kautter | 260—526 |
| 2,613,222 | 10/1952 | Specht et al. | 260—526 |
| 2,734,915 | 2/1956 | Jones | 260—526 |
| 2,936,267 | 5/1960 | Fernholz | 203—44 |

FOREIGN PATENTS

| | | |
|---|---|---|
| 831,052 | 3/1960 | Great Britain. |
| 854,239 | 11/1960 | Great Britain. |

OTHER REFERENCES

Hammond: Separation and Purification of Materials, p. 163 (1958).

Kaszuba: J.A.C.S. 67, p. 1227 (1945).

Weissberger: Technique of Organic Chemistry, vol. III, Interscience Publishers, Inc., New York, p. 185 (1950).

LORRAINE A. WEINBERGER, *Primary Examiner.*

L. ZITVER, G. P. D'ANGELO, I. R. PELLMAN, R. K. JACKSON, *Examiners.*